(12) United States Patent
Lee et al.

(10) Patent No.: US 9,315,649 B2
(45) Date of Patent: Apr. 19, 2016

(54) ADDITIVE COMPOSITION INCLUDING COUNTERAGENT

(71) Applicants: DOOBON INC., Chungcheongbuk-do (KR); Dae Hee Lee, Cheongju-si, Chungcheongbuk-do (KR)

(72) Inventors: Dae Hee Lee, Cheongju-si (KR); Hyun-Duk Cho, Cheongju-si (KR); Young-Guk Kim, Cheongju-si (KR); Xiao-Xia Wang, Cheongju-si (KR)

(73) Assignees: DOOBON INC., Chungcheongbuk-Do (KR); Dae Hee Lee, Chungcheongbuk-Do (KR)

( * ) Notice: Subject to any disclaimer, the term of this patent is extended or adjusted under 35 U.S.C. 154(b) by 114 days.

(21) Appl. No.: 14/067,048

(22) Filed: Oct. 30, 2013

(65) Prior Publication Data

US 2015/0045492 A1    Feb. 12, 2015

(30) Foreign Application Priority Data

Aug. 6, 2013    (KR) .................. 10-2013-0093167

(51) Int. Cl.
| | |
|---|---|
| *C08K 5/05* | (2006.01) |
| *C08K 5/053* | (2006.01) |
| *C08K 13/02* | (2006.01) |
| *C08K 9/04* | (2006.01) |
| *C08K 3/26* | (2006.01) |

(52) U.S. Cl.
CPC ............... *C08K 5/053* (2013.01); *C08K 13/02* (2013.01); *C08K 9/04* (2013.01); *C08K 2003/267* (2013.01)

(58) Field of Classification Search
CPC ....................................................... C08K 5/053
USPC .................................. 524/387; 106/463, 419
See application file for complete search history.

(56) References Cited

U.S. PATENT DOCUMENTS

| | | | |
|---|---|---|---|
| 4,611,024 A | 9/1986 | Wolfe | |
| 2003/0125432 A1* | 7/2003 | Yukino et al. | ................. 524/136 |
| 2007/0123620 A1 | 5/2007 | Nayak et al. | |
| 2010/0187473 A1* | 7/2010 | Hyun et al. | .............. 252/182.33 |

FOREIGN PATENT DOCUMENTS

| | | |
|---|---|---|
| CN | 101802087 A | 8/2010 |
| CN | 103068902 A | 4/2013 |
| JP | 1993017637 A | 1/1993 |
| JP | 07173340 A | 7/1995 |
| JP | 09067501 | 3/1997 |
| JP | 10316727 A | 12/1998 |
| JP | 2001181445 A | 7/2001 |
| JP | 2002332359 A | 11/2002 |
| JP | 2003096246 A | 4/2003 |
| JP | 2003268168 | 9/2003 |
| JP | 2009507982 A | 2/2009 |
| JP | 2009508995 A | 3/2009 |
| JP | 2009155465 A | 7/2009 |
| JP | 2011207991 | 10/2011 |
| TW | 200946455 A | 11/2009 |
| WO | 9831741 A1 | 7/1998 |

OTHER PUBLICATIONS

Korean Office Action dated Dec. 26, 2013.
Korean Notice of Allowance dated Sep. 15, 2014.
Advanced Polymer Trading FZC, 2006, 1 pages, Kisuma Chemical.
European Search Report dated Nov. 26, 2014.
Taiwanese Office Action dated Dec. 5, 2014.
Japanese Office Action dated Dec. 5, 2014.
Japanese Notice of Allowance dated Mar. 20, 2015.

* cited by examiner

*Primary Examiner* — Hannah Pak
(74) *Attorney, Agent, or Firm* — Hauptman Ham, LLP

(57) ABSTRACT

The present invention relates to an additive composition including a counteragent, and more particularly, to an additive composition for preparation of polyolefins, which improve flowability of a nucleating agent and exhibits excellent transparency, by applying a counteragent of a specific structure to a sorbitol nucleating agent which is an additive used in preparation of polyolefins.

8 Claims, No Drawings

ADDITIVE COMPOSITION INCLUDING COUNTERAGENT

CROSS-REFERENCE TO RELATED APPLICATION

This application claims priority to Korean Patent Application No. 10-2013-0093167 filed on Aug. 6, 2013, and all the benefits accruing therefrom under 35 U.S.C. §119, the contents of which is incorporated by reference in its entirety.

BACKGROUND

1. Technical Field

The present invention relates to an additive composition including a counteragent, and more particularly, to an additive composition for preparation of polyolefins, which improve flowability of a nucleating agent and exhibits excellent transparency, by applying a counteragent of a specific structure to a sorbitol nucleating agent which is an additive used in preparation of polyolefins.

2. Description of the Related Art

Generally, polymers are processed and produced so as to exhibit specific properties such as molecular weight, molecular weight distribution, conformation, composition distribution, stereoregularity, crystal structures, amorphous structures, molecular orientation, phase, and the like in order to realize performance and functionality suited to specific applications.

Such properties can be controlled by catalysts, polymerization conditions, polymerization methods and additives, and particularly, nucleating agents serve to control the crystal structure of polymers among such additives. Generally, when nucleating agents are added to polymers, various effects, such as improvement of stiffness, transparency and gloss properties, reduction of a molding cycle, and the like can be obtained. For example, the nucleating agent increases the degree of crystallization of a crystalline resin such as polypropylene during a curing process from a molten state to a solid state, thereby suppressing light scattering while improving transparency and gloss.

Such nucleating agents for polypropylene include AI-PT-BBA and sorbitol nucleating agents. Particularly, sorbitol nucleating agents exhibit excellent properties in terms of stiffness and transparency, and thus are widely used.

Such nucleating agents may improve various properties. In this regard, uniform dispersion of a nucleating agent is very important in order to maximize performance thereof. When the nucleating agent is unevenly dispersed, a prepared polymer exhibits significantly deteriorated properties in terms of stiffness, transparency and the like, and a preparation process thereof is not efficient.

Particularly, although sorbitol nucleating agents have been actively developed due to excellent effects thereof, strong adhesion and cohesion of the sorbitol nucleating agents cause a serious problem of non-uniform dispersion thereof during mixing after addition. Moreover, depending upon molding conditions, the nucleating agents are attached to dies, molds, rolls and the like, possibly resulting in product failure.

To solve such problems, although uniaxially oriented polypropylene (OPP) films having excellent transparency are prepared using high melting point polymeric nucleating agents, such as polyvinyl cycloalkane, poly(3-methyl-1-butene), polyalkenyl silane, and the like, the high melting point polymeric nucleating agents provide limited performance when used alone in powder form, and thus cannot function well as a substitute for sorbitol nucleating agents.

Moreover, although complexation of the sorbitol nucleating agent with diverse materials has been studied to solve problems of adhesion and cohesion thereof, existing complexed sorbitol nucleating agents have a serious problem in that transparency of prepared polymers is not secured.

Thus, development of additive compositions capable of solving drawbacks in terms of adhesion and cohesion while improving stiffness and transparency of prepared polymers is an urgent issue.

BRIEF SUMMARY

An aspect of the present invention is to provide an additive composition which can minimize failure of prepared polymer products and improve transparency and stiffness thereof by solving drawbacks of a sorbitol nucleating agent used as an additive in preparation of the polymers, that is, problems of adhesion and cohesion of the sorbitol nucleating agent, while improving flowability and securing uniform dispersibility thereof.

In accordance with one embodiment of the present invention, an additive composition includes: (a) a sorbitol acetal compound; and (b) a counteragent represented by Formula 1.

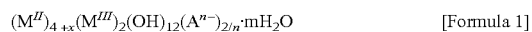   [Formula 1]

wherein $M^{II}$ is at least one 2-valent metal selected from the group consisting of Mg, Ca, Co, Zn, and Ni; $M^{III}$ is a 3-valent metal selected from the group consisting of Al, Fe, Co, Mn, and Ti; $A^{n-}$ is an anion having a valence of n and is selected from the group consisting of $CO_3^{2-}$, $HPO_4^{2-}$, $NO_3^-$, $SO_4^{2-}$, $OH^-$ $F^-$, $F^-$, $Cl^-$, and $Br^-$; and $0 \leq x \leq 4$ and $m \geq 0$.

According to the invention, the additive composition exhibits improved properties in terms of adhesion and cohesion by including a counteragent, and thus provides effects in that product failure rate is significantly lowered when the additive composition is used in preparation of polyolefins, and in that the prepared polyolefins exhibit excellent properties in terms of transparency and stiffness.

DETAILED DESCRIPTION

Embodiments of the present invention will now be described in more detail.

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the present invention is defined only by the claims.

Hereinafter, an additive composition including a counteragent according to embodiments of the present invention will be described in detail.

According to one embodiment of the invention, the additive composition includes: (a) a sorbitol acetal compound; and (b) a counteragent represented by Formula 1:

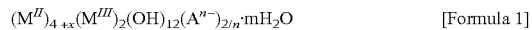   [Formula 1]

wherein $M^{II}$ is at least one 2-valent metal selected from the group consisting of Mg, Ca, Co, Zn, and Ni; $M^{III}$ is a 3-valent metal selected from the group consisting of Al, Fe, Co, Mn, and Ti; $A^{n-}$ is an anion which has a valence of n and is selected from the group consisting of $CO_3^{2-}$, $HPO_4^{2-}$, $NO_3^-$, $SO_4^{2-}$, $OH^-$ $F^-$, $F^-$, $Cl^-$, and $Br^-$; and $0 \leq x \leq 4$ and $m \geq 0$.

The (a) sorbitol acetal compound functions as a nucleating agent and may be selected from, for example, 1,3:2,4-bis(p-methylbenzylidene)sorbitol; bis(3,4-dimethylbenzylidene) sorbitol; bis(p-ethylbenzylidene)sorbitol; bis(p-methylbenzylidenesorbitol); dibenzylidenesorbitol; 1,2,3-trideoxy-4,6: 5,7-bis-O-[(4-propylphenyl)methylene]-nonitol; and the like. In addition, the (a) sorbitol acetal compound may further include: sodium benzoate; lithium benzoate; aluminum benzoate; micronized talc; organophosphorus salts; and the like.

The (b) counteragent is defined by Formula 1.

According to the invention, the (b) counteragent of Formula 1 is coated onto a surface of the (a) sorbitol acetal compound, and reduces adhesion and cohesion of the (a) sorbitol acetal compound to improve flowability and dispersibility of the (a) sorbitol acetal compound in preparation of polyolefin.

The (b) counteragent of Formula 1 may have a volume average particle size (Mv) of less than 20 μm and a D90 value of less than 50 μm, and preferably has an Mv of less than 1.0 μm and a D90 value of less than 5.0 μm.

Here, a D90 value of less than 50 μm means that 90% (volume %) of actual counteragent particles included in the additive composition have a diameter of less than 50 μm.

If the D90 value exceeds the above value, there is a problem in that the additive composition exhibits deteriorated dispersibility due to non-uniform particle size and exhibits poor transparency due to excessively increased particle size.

According to the invention, the (b) counteragent of Formula 1 may have an index of refraction from 1.47 to 1.62.

If the index of refraction of the (b) counteragent is not within this range, there is a problem of deterioration in transparency of polymer products due to a great difference in index of refraction between the additive composition and polyolefin.

The (b) counteragent of Formula 1 may be coated with a surface treatment agent.

The surface treatment agent may include at least one compound selected from among fatty acids, silane coupling agents, titanate coupling agents, phosphate esters, and aluminum coupling agents. More particularly, examples of the surface treatment agent include: higher fatty acids such as stearic acid, nonanoic acid, and the like; silane coupling agents (Formula: Y—Si(OR)$_3$, wherein Y is an alkyl, vinyl, aryl, amino, methacryl or mercapto group, and R is a methyl, ethyl, acetyl, propyl, isopropyl, isopropylphenoxy or phenoxy group); titanate coupling agents such as isopropyl triisostearoyl titanate, isopropyl tris(dioctylpyrophosphate) titanate, isopropyl tri(N-aminoethyl-aminoethyl) titanate, isopropyl tridecylbenzenesulfonyl titanate, and the like; phosphate esters such as orthophosphoric acid, mono or di-esters of stearyl alcohol, and the like; and aluminum coupling agents such as acetalkoxy aluminum diisopropylate, and the like.

Here, the surface treatment agent may be present in an amount of 0.1 parts by weight to 5 parts by weight based on 100 parts by weight of the counteragent. If the amount of the surface treatment agent is below 0.1 parts by weight, the additive composition has deteriorate properties in terms of dispersibility and water resistance, and if the amount of the surface treatment agent exceeds 5 parts by weight, organic materials can exude from a polymer product in preparation thereof (plate-out phenomenon), and the polymer product can be deteriorated in heat resistance.

According to the invention, based on 100 parts by weight of the additive composition, the (b) counteragent of Formula 1 is present in an amount of 0.01 parts by weight to 30 parts by weight, preferably 1 part by weight to 5 parts by weight. If the amount of the (b) counteragent of Formula 1 is below this range, the additive composition can exhibit poor properties in terms of flowability and dispersibility, and if the amount of the (b) counteragent of Formula 1 exceeds this range, the polymer products can exhibit poor transparency.

According to the invention, as a method for complexation of the (b) counteragent of Formula 1 with the (a) sorbitol acetal compound, addition of the counteragent in preparation of the sorbitol acetal compound, and mixing the counteragent with the sorbitol acetal compound after preparation of the sorbitol acetal compound may be used. Here, methods for complexation by mixing the counteragent with the sorbitol acetal compound include simple mixing, pulverization mixing, coating mixing, melt mixing, and the like.

The present invention includes a polyolefin composition including the additive composition according to the invention.

When the additive composition including the counteragent according to the invention is used, the polyolefin composition exhibits excellent quality and transparency due to improved processibility thereof. That is, since the additive composition including the counteragent according to the invention exhibits excellent properties in terms of flowability and dispersibility, it is possible to prepare a polyolefin composition exhibiting excellent properties and high uniformity.

Next, the present invention will be described in more detail with reference to examples. However, it should be understood that these examples are provided for illustration only and are not to be in any way construed as limiting the present invention.

EXAMPLES

1. Preparation of Sorbitol Acetal Compound Complexed with Counteragent (Additive Composition)

Additive compositions of Examples were prepared in powder form by complexing a counteragent with a sorbitol acetal compound using a Henschel mixer under conditions as listed in Table 1. For comparison, sorbitol acetal compounds absent the counter agent according to the invention were prepared as Comparative Examples.

TABLE 1

|  | Sorbitol acetal compound | Counteragent | Surface treatment agent |
| --- | --- | --- | --- |
| Example 1 | 97 parts by weight of bis(3,4-dimethylbenzylidene) sorbitol | 3 parts by weight of Mg$_4$Al$_2$(OH)$_{12}$CO$_3$ 3H$_2$O | — |
| Example 2 | 97 parts by weight of bis(3,4-dimethylbenzylidene) sorbitol | 3 parts by weight of Mg$_{4.5}$Al$_2$(OH)$_{13}$CO$_3$ 3.5H$_2$O | 2 parts by weight of sodium stearate |
| Example 3 | 97 parts by weight of bis(3,4-dimethylbenzylidene) sorbitol | 3 parts by weight of Mg$_6$Al$_2$(OH)$_{16}$CO$_3$ 4H$_2$O | 2.5 parts by weight of stearic acid |
| Example 4 | 97 parts by weight of bis(3,4-dimethylbenzylidene) sorbitol | 3 parts by weight of Mg$_3$ZnAl$_2$(OH)$_{12}$CO$_3$ 3H$_2$O | 3 parts by weight of lithium stearate |
| Example 5 | 97 parts by weight of bis(3,4-dimethylbenzylidene) sorbitol | 3 parts by weight of Mg$_{4.5}$Al$_2$(OH)$_{13}$CO$_3$ 3.5H$_2$O | 2 parts by weight of stearic acid |

TABLE 1-continued

| | Sorbitol acetal compound | Counteragent | Surface treatment agent |
|---|---|---|---|
| Comparative Example 1 | 100 parts by weight of bis(3,4-dimethylbenzylidene) sorbitol | — | — |
| Comparative Example 2 | 97 parts by weight of bis(3,4-dimethylbenzylidene) sorbitol | — | 3 parts by weight of hydrophobic $SiO_2$ |

Here, the counteragents used in Examples had a volume average particle size (Mv) of 0.5 tm and a D90 value of 2.5 μm, and the hydrophobic $SiO_2$ used in Comparative Examples had an Mv of 0.5 tm and a D90 value of 2.5 μm.

2. Evaluation of Properties of Sorbitol Acetal Compound Complexed with Counteragent (Additive Composition)

(1) Powder Flowability

Powder flowability is recorded as flow characteristics such as impregnated strength, internal friction, wall friction, shear strength, tensile strength, apparent specific gravity, and the like. Powder flowability was measured in accordance with KS L 1618-4 (2003) (Test methods of properties of ceramic granules: Flowability), and apparent specific gravity was measured in accordance with ASTM D1895-96.

(2) Index of Refraction

Index of refraction was measured using an ATAGO ABBE refractometer in accordance with JIS K 0062 (Test methods for index of refraction of chemical products).

(3) Average Particle Size

Laser diffraction analysis, which is a common technique used for measurement of particle size distribution of powders, was carried out. In this method, a sample was dispersed in a liquid and passed through a transparent cell illuminated by a laser beam to detect a laser scattering pattern by a photodiode array, and particle sizes were measured. Particle size distribution was recorded by calculation using a parameter measured by a laser diffraction analyzer. Particularly, according to the invention, My represents an arithmetic average particle size measured by volume, and D90 means a particle size corresponding to 90% of the cumulative volume-based distribution.

(4) Evaluation Results

By the above property evaluation methods, the additive compositions of Examples and Comparative Examples were evaluated as to flowability, apparent specific gravity, index of refraction, and average particle size. Results are shown in Table 2.

TABLE 2

| | Flowability | Apparent specific gravity | Index of refraction | Average particle size (μm) |
|---|---|---|---|---|
| Example 1 | 2.4 | 0.36 | 1.52 | 2.46 |
| Example 2 | 2.4 | 0.36 | 1.52 | 2.43 |
| Example 3 | 2.4 | 0.35 | 1.52 | 2.48 |
| Example 4 | 2.4 | 0.36 | 1.52 | 2.43 |
| Example 5 | 2.4 | 0.37 | 1.52 | 2.43 |
| Comparative Example 1 | 1.2 | 0.29 | 1.52 | 2.67 |
| Comparative Example 2 | 1.6 | 0.32 | 1.47 | 2.55 |

3. Preparation of Polyolefin Resin Using Additive Composition

Polypropylene random copolymer flakes, each of the additive compositions prepared in Examples and Comparative Examples, a first antioxidant (Irganox 1010), a second antioxidant (Irgafos 168) and an antistatic agent were mixed, followed by formulation of the mixture using an extruder at about 230° C. Then, the formulated resin was molded as a plaque at a molten material temperature of about 230° C. to produce samples for property evaluation. Table 3 shows the compositions used in preparation of the samples.

TABLE 3

| | Sample 1 | Sample 2 | Sample 3 | Sample 4 | Sample 5 | Sample 6 | Sample 7 |
|---|---|---|---|---|---|---|---|
| First antioxidant | 20 parts by weight | 20 parts by weight | 20 parts by weight | 20 parts by weight | 20 parts by weight | 20 parts by weight | 20 parts by weight |
| Second antioxidant | 20 parts by weight | 20 parts by weight | 10 parts by weight | 10 parts by weight | 10 parts by weight | 10 parts by weight | 10 parts by weight |
| Antistatic agent | 10 parts by weight | 10 parts by weight | 10 parts by weight | 10 parts by weight | 10 parts by weight | 10 parts by weight | 10 parts by weight |
| Additive composition of Example 1 | 50 parts by weight | — | — | — | — | — | — |
| Additive composition of Example 2 | — | 50 parts by weight | — | — | — | — | — |
| Additive composition of Example 3 | — | — | 50 parts by weight | — | — | — | — |
| Additive composition of Example 4 | — | — | — | 50 parts by weight | — | — | — |
| Additive composition of Example 5 | — | — | — | — | 50 parts by weight | — | — |
| Additive composition of Comparative Example 1 | — | — | — | — | — | 50 parts by weight | — |

TABLE 3-continued

|  | Sample 1 | Sample 2 | Sample 3 | Sample 4 | Sample 5 | Sample 6 | Sample 7 |
|---|---|---|---|---|---|---|---|
| Additive composition of Comparative Example 2 | — | — | — | — | — | — | 50 parts by weight |

4. Property Evaluation of Prepared Polyolefin Resin

Properties of the polyolefin resins (Samples 1 to 7) prepared using the additive compositions of Examples and Comparative Examples were evaluated, and results are shown in Tables 4 to 6.

Property evaluation was carried out by the following methods. (1) Melt flow index: Melt flow index was measured at 230° C. under a load of 2.16 kg in accordance with ASTM D1238DP.

(2) Flexural modulus: Flexural modulus was measured at 23° C. and at 50% RH in accordance with ASTM D790.

(3) Izod impact strength: Izod impact strength was measured at 23° C. and at 50% RH in accordance with ASTM D256.

(4) Crystallization temperature: Crystallization temperature was measured at a heating rate of 10° C./min via differential scanning calorimetry.

(5) Transparency (haze)

Transparency of each of the injection molded specimens having a thickness of 1 mm and 2 mm was measured at 190° C., 210° C., 230° C. and 250° C. in accordance with ASTM D1003. Lower haze values indicate superior transparency.

(6) Colorimeter measurement

Measurement was performed in accordance with KS A 0067 Color specification-CIE Lab and CIE Luv color spaces, and a color value was confirmed by *b of a Lab color space.

TABLE 4

|  | Sample 1 | Sample 2 | Sample 3 | Sample 4 | Sample 5 | Sample 6 | Sample 7 |
|---|---|---|---|---|---|---|---|
| Melt flow index (MI) (g/10 min) | 17.3 | 17.6 | 17.6 | 17.2 | 17.5 | 16.9 | 17.1 |
| Flexural modulus (kg/cm$^2$) | 18,100 | 18,100 | 18,100 | 18,000 | 15,100 | 18,000 | 18,000 |
| Izod impact strength (kg · cm/cm) | 9.4 | 9.5 | 9.5 | 9.4 | 9.4 | 8.9 | 9.0 |
| Crystallization temperature (° C.) | 130.4 | 130.5 | 130.7 | 130.4 | 130.4 | 130.3 | 130.4 |
| Colorimeter (*b) | 0.24 | 0.20 | 0.18 | 0.26 | 0.25 | 0.66 | 0.56 |

TABLE 5

| Unit: % | | Sample 1 | Sample 2 | Sample 3 | Sample 4 | Sample 5 | Sample 6 | Sample 7 |
|---|---|---|---|---|---|---|---|---|
| HAZE (1 mm thick specimens) | 190° C. | 13.00 | 12.88 | 12.72 | 13.32 | 13.00 | 13.45 | 13.20 |
| | 210° C. | 10.70 | 10.52 | 10.34 | 10.90 | 10.50 | 11.00 | 11.00 |
| | 230° C. | 9.40 | 9.38 | 9.30 | 9.38 | 9.35 | 9.42 | 9.40 |
| | 250° C. | 8.70 | 8.68 | 8.52 | 8.84 | 8.80 | 8.94 | 8.90 |

TABLE 6

| Unit: % | | Sample 1 | Sample 2 | Sample 3 | Sample 4 | Sample 5 | Sample 6 | Sample 7 |
|---|---|---|---|---|---|---|---|---|
| HAZE (2 mm thick specimens) | 190 | 27.68 | 27.64 | 27.62 | 28.12 | 28.11 | 28.22 | 28.32 |
| | 210 | 20.64 | 20.62 | 20.56 | 21.26 | 21.26 | 21.34 | 21.46 |
| | 230 | 20.56 | 20.56 | 20.44 | 20.94 | 20.50 | 21.32 | 21.32 |
| | 250 | 20.40 | 20.42 | 20.30 | 20.54 | 20.45 | 21.00 | 21.00 |

As shown in Table 4, from the results of the polyolefin resins prepared as described above, it can be seen that, when the additive composition complexed with the counteragent according to the invention was used, the polyolefin resin exhibited excellent properties in terms of melt flow index, flexural modulus, Izod impact strength and crystallization temperature. In addition, it can be seen that, when the additive composition complexed with the counteragent was used, a yellow color of the polymer product was not predominant due to a low *b value.

Further, when the additive composition was complexed with the counteragent, the prepared polyolefin resin exhibited excellent transparency.

Although the present invention has been described with reference to some embodiments, it should be understood that the foregoing embodiments are provided for illustrative purposes only and are not to be in any way construed as limiting the present invention, and that various modifications, changes, alterations, and equivalent embodiments can be made by those skilled in the art without departing from the spirit and scope of the invention. Therefore, the scope of the invention should be limited only by the to accompanying claims and equivalents thereof.

What is claimed is:

1. An additive composition comprising:
    (a) a sorbitol acetal compound; and
    (b) a counteragent represented by Formula 1:

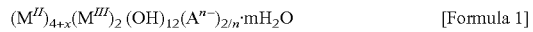  [Formula 1]

wherein $M^{II}$ is at least one 2-valent metal selected from the group consisting of Mg, Ca, Co, Zn, and Ni;

$M^{III}$ is a 3-valent metal selected from the group consisting of Al, Fe, Co, Mn, and Ti;

$A^{n-}$ is an anion having a valence of n and is selected from the group consisting of $HPO_4^{2-}$, $NO_3^-$, $SO_4^{2-}$, $OH^-$, $F^-$, $Cl^-$, and $Br^-$; and $0 \leq x \leq 4$ and $m \geq 0$, wherein the counteragent of Formula 1 has an index of refraction from 1.47 to 1.62.

2. The additive composition according to claim 1, wherein the counteragent of Formula 1 has a volume average particle size (Mv) of less than 20μm, and a D90 value of less than 50 μm.

3. The additive composition according to claim 1, wherein the counteragent of Formula 1 has a volume average particle size (Mv) of less than 1.0 μm, and a D90 value of less than 5.0 μm.

4. The additive composition according to claim 1, wherein the counteragent of Formula 1 is coated with a surface treatment agent.

5. The additive composition according to claim 4, wherein the surface treatment agent comprises at least one compound selected from the group consisting of fatty acids, slime coupling agents, titanate coupling agents, phosphate esters, and aluminum coupling agents.

6. The additive composition according to claim 4, wherein the surface treatment agent is present in an amount of 0.1 parts by weight to 5 parts by weight based on 100 parts by weight of the counteragent.

7. The additive composition according to claim 1, wherein the counteragent of Formula 1 is present in an amount of 0.01 parts by weight to 30 parts by weight based on 100 parts by weight of the additive composition.

8. A polyolefin composition comprising the additive composition according to claim 1.

* * * * *